Sept. 8, 1925.  1,552,880
R. RAYSON
APPARATUS FOR USE IN FREEZING, CHILLING, AND THAWING FOODSTUFFS
Filed Jan. 29, 1923
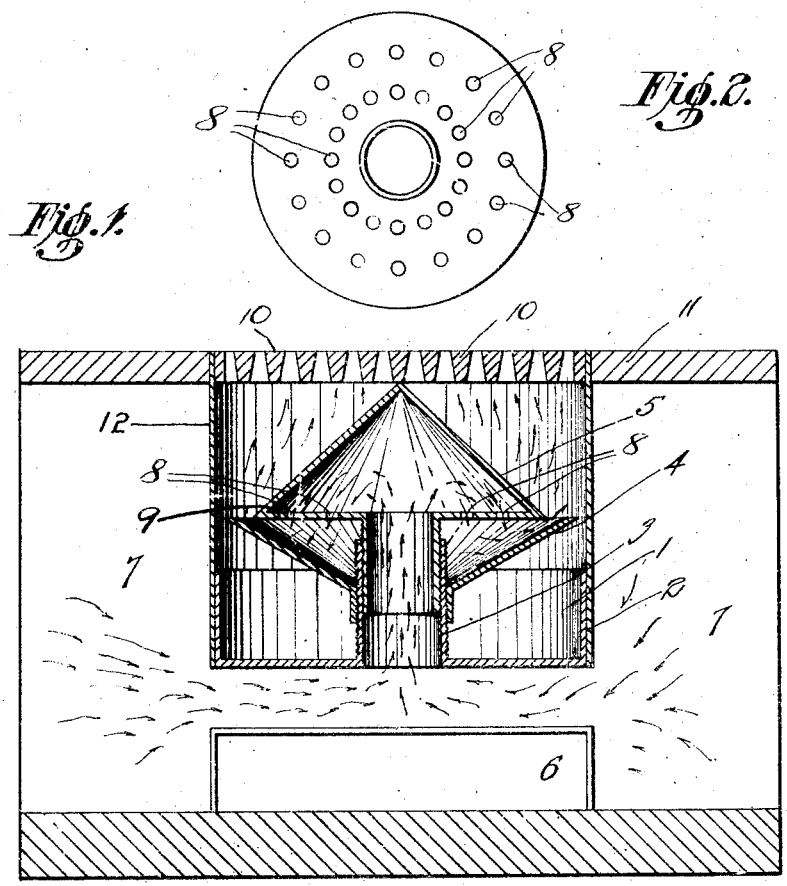
Inventor
R. Rayson
by Langmac, Parry, Card & Langmac
Attys.

Patented Sept. 8, 1925.

1,552,880

UNITED STATES PATENT OFFICE.

RUSSELL RAYSON, OF ELSTERNWICK, NEAR MELBOURNE, VICTORIA, AUSTRALIA.

APPARATUS FOR USE IN FREEZING, CHILLING, AND THAWING FOODSTUFFS.

Application filed January 29, 1923. Serial No. 615,694.

*To all whom it may concern:*

Be it known that RUSSELL RAYSON, a citizen of the Commonwealth of Australia, and resident of 166 Cochrane Street, Elsternwick, near Melbourne, in the State of Victoria, Commonwealth of Australia, has invented a certain new and useful Apparatus for Use in Freezing, Chilling, and Thawing Foodstuffs, of which the following is a specification.

This invention relates to apparatus for use in freezing, chilling and thawing foodstuffs and has been devised in order to provide simple and efficient means whereby an equal flow of air can be caused to flow over and about the material in store, and the primary object of the invention is to provide for the safe and hygienic carriage of comestibles at sea.

The invention comprises air boxes each consisting of a cone adjustably mounted on a stem piece preferably circular in section and with upturned sides, the stem piece being hollow and adapted to communicate with the cone which is provided on the undersurface with a plurality of radially disposed openings while the stem also supports an inverted cone which may also be moved upwardly and downwardly on the stem.

The structure described has in combination therewith a sump preferably disposed under the apparatus described, and this sump may be filled or partly filled by any suitable circulatory system with hot or cold water for humidifying purposes.

But in order to more readily understand the invention it will now be described with reference to the accompanying drawings in which:—

Figure 1 is a view showing an apparatus constructed according to this invention, Figure 2 is a view showing the formation of the wider surface of the cone.

According to this invention a T piece 1 is provided having upturned sides 2 and a central hollow circular portion 3 which is provided on the exterior and interior surface with a screw thread which is adapted to receive an adjustable inverted cone member or deflector 4 and a cone member 5 which is also adjustable along the portion 3 of the member 1.

Disposed preferably immediately under the member 1 but leaving a space between is a sump 6 formed of channel iron or cement and adapted to hold hot or cold water for humidifying the air as it passes along the ducts 7 and upwardly as shown by the arrows to eventually pass through radially disposed holes or openings 8 formed in the under surface 9 of the cone 5 and then deflected by means of the inverted cone 4 to pass through the table grating 10 or hatch planks arranged over the hatchways 11 of the vessel, such apparatus described and shown in the drawing being supported in a shield 12 secured to the deck of the vessel.

The air may be caused to flow either from the floor or ceiling of the vessel, or it may be controlled by suction, and also it may be discharged to the atmosphere or taken from the atmosphere as desired or according to existing conditions.

When carrying other than refrigerated cargo the grating 10 is dispensed with and replaced by the usual hatch planks.

A number of the apparatuses described are used in one vessel and are so arranged that they are in communication with the existing air ways, and they may also be arranged above and below the cargo, the air flowing from the lower to the upper row of devices described or vice versa.

The flow of air is regulated by screwing the cones 4 and 5 upwardly or downwardly, so that the cones 4 and 5 may be separated or brought close together according to requirements.

The invention is particularly advantageous for use with vessels at sea, although it is obvious that it may be used on land in stores and the like, wherever it is necessary to maintain an even temperature throughout a specified space of time.

What I claim as my invention and desire to secure by Letters Patent is:—

1. Apparatus for the purposes specified, comprising, a closed hollow cone, a hollow stem on the cone, openings at the base of the cone, and an inverted cone below the hollow cone, whereby air can pass into the hollow cone, and out against the inverted cone, and thence to atmosphere.

2. Apparatus for the purposes specified, comprising, a support shield securable to the deck of a vessel, a member placed at the lower portion of the shield, a central circular portion on the member, an internal and an external thread on the central circular portion, a cone member with a stem screwed into the central circular portion, a deflector member having an internally threaded portion screwed on the central circular portion, and a portable grating positioned over the above said members.

Signed at Melbourne, Victoria, Australia, this 4th day of December, 1922.

RUSSELL RAYSON.